United States Patent [19]

Klingen et al.

[11] Patent Number: 4,749,590

[45] Date of Patent: Jun. 7, 1988

[54] PRESSURE-SENSITIVE ADHESIVE TAPE CONTAINING HYDROPHOBIC SILICA

[75] Inventors: Jurgen Klingen, Schwalmtal, Fed. Rep. of Germany; Patrick G. Zimmerman, Saint Paul, Minn.

[73] Assignee: Minnesota Mining and Manufacturing Company, St. Paul, Minn.

[21] Appl. No.: 85,550

[22] Filed: Aug. 17, 1987

Related U.S. Application Data

[60] Division of Ser. No. 888,787, Jul. 22, 1986, Pat. No. 4,710,536, which is a continuation-in-part of Ser. No. 763,458, Aug. 7, 1985, abandoned.

[51] Int. Cl.$^4$ .............................................. B05D 3/06
[52] U.S. Cl. ................................. 427/54.1; 427/208.4
[58] Field of Search .................. 427/53.1, 54.1, 208.4; 428/355

[56] References Cited

U.S. PATENT DOCUMENTS

| | | | |
|---|---|---|---|
| Re. 24,906 | 12/1960 | Ulrich | 206/59 |
| 2,859,198 | 11/1958 | Sears et al. | 260/37 |
| 3,024,146 | 3/1962 | Bueche et al. | 154/43 |
| 3,993,608 | 11/1976 | Wells | 428/425 |
| 4,163,081 | 7/1979 | Schulz | 428/429 |
| 4,223,067 | 9/1980 | Levens | 428/308 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,415,615 | 11/1983 | Esmay et al. | 428/40 |
| 4,657,958 | 4/1987 | Fieldhouse et al. | 524/247 |

FOREIGN PATENT DOCUMENTS 747341 11/1966 Canada.

OTHER PUBLICATIONS

"Technical Bulletin Pigments" No. 6 of Degussa Corp., Teterboro, N.J., dated Mar. 1981.
Degussa Bulletin - "Precipitated Silicas and Silicates", Dec. 1978.
4-page Degussa Bulletin-"Product Information" marked PL/sk 6/4/84, *Chemical Abstracts*, vol. 88, 1978, 88:153860 (p. 59), Japanese Kokai 77,133,339.
"Cab-O-Sil" N70-TS Hydrophobic Fumed Silica of Cabot Cab-O-Sil Division, Tuscola, Ill., dated Sep. 1983.

*Primary Examiner*—John H. Newsome
*Attorney, Agent, or Firm*—Donald M. Sell; James A. Smith; Darla P. Neaveill

[57] ABSTRACT

By incorporating hydrophobic silica into acrylic pressure-sensitive adhesive tape, the shear strength at elevated temperatures is significantly improved, and adhesion and physical properties are maintained or improved. The hydrophobic silica preferably has a surface area from 50 to 400 m$^2$/g. A preferred acrylic pressure-sensitive adhesive layer comprises a copolymer of (a) at least one alkyl acrylate having an average of 4-12 carbon atoms in its alkyl group and (b) from 3 to 20% by weight of copolymerizable monomer having a polar group such as acrylic acid.

6 Claims, No Drawings

PRESSURE-SENSITIVE ADHESIVE TAPE CONTAINING HYDROPHOBIC SILICA

This is a division of application Ser. No. 888,787 filed July 22, 1986, now U.S. Pat. No. 4,710,536 which is a continuation-in-part of Ser. No. 763,458, filed Aug. 7, 1985 now abandoned.

FIELD OF THE INVENTION

The invention concerns pressure-sensitive adhesive tape, the adhesive layer of which comprises a copolymer of acrylic acid ester of nontertiary alcohol and copolymerizable monomer such as acrylic acid as disclosed in U.S. Pat. Re. 24,906 (Ulrich), here sometimes called "acrylic pressure-sensitive adhesive tape". Although acrylic pressure-sensitive adhesive tape may provide the highest shear strength of any pressure-sensitive adhesive tape that also has good adhesion, there has been a need for even higher shear strength, especially at elevated temperatures, without any reduction in adhesion.

BACKGROUND ART

As stated in U.S. Pat. No. 4,223,067 (Levens): "Tapes having pressure-sensitive adhesive layers exceeding 0.1-0.2 mm in thickness tend to be difficult and expensive to manufacture and to have low shear strength. For applications requiring greater thickness, foam-backed pressure-sensitive adhesive tapes such as disclosed in Canadian Pat. No. 747,341 are often employed. However, the porous nature of the foam involves a number of problems such as a tendency to wick liquids. The elastic memory of some foams tends to cause them to lift from low spots on rough or uneven surfaces. Foam layers of less than about 1.0 mm are difficult to manufacture and hence rather expensive". The Levens patent solved those problems by means of a pressure-sensitive adhesive tape such as an acrylate pressure-sensitive adhesive tape, the adhesive layer of which consists essentially of a polymeric pressure-sensitive adhesive matrix filled with glass microbubbles that give the tape the physical appearance and feel of a foam-backed tape. Because the pressure-sensitive adhesive matrix is substantially free from voids, the pressure-sensitive adhesive layer of the Levens tape shows substantially no water absorption.

In spite of their shortcomings, foam-backed pressure-sensitive adhesive tapes continue to be widely used. The Levens foam-like tape also is widely used, but it often has been necessary to apply to each face of its microbubble-filled adhesive layer a layer of unfilled pressure-sensitive adhesive, without which the foam-like tape has not exhibited sufficiently high cohesive strength, especially at elevated temperatures. Because those added layers substantially increase the cost of the foam-like tape, the less expensive foam-backed tapes have continued to dominate the market even though inferior in performance.

As taught in the Levens patent, its microbubble-filled adhesive layer preferably is made by dispersing the glass microbubbles into partially polymerized monomers which then are polymerized by exposure to ultraviolet radiation. The same technique permits the formation of unfilled pressure-sensitive adhesive layers of greater thickness than can be coated economically from solution or emulsion. However, such unfilled pressure-sensitive adhesive layers of greater thickness tend to exhibit lower cohesive strength than do microbubble-filled layers of equal thickness, especially at elevated temperatures. Regardless of thickness or whether filled with glass microbubbles or unfilled, prior efforts to modify pressure-sensitive adhesive tapes to improve cohesive strength usually have resulted in reduced adhesion.

OTHER PRIOR ART

Since at least as early as 1941, finely divided silica has been used for the thickening of liquids, usually in a hydrophilic form, but also in hydrophobic form. See, for example, "Technical Bulletin Pigments" No. 6 of Degussa Corp., Teterboro, N.J., dated March 1981, the cover of which shows the schematic structure of a hydrophobic silica. Another Degussa bulletin, "Precipitated Silicas and Silicates", dated December 1978, lists a number of hydrophilic and hydrophobic silicas and gives uses for specific silica products. A 4-page Degussa bulletin entitled "Product Information" marked "PL/sk 6/4/84", indicating the date June 4, 1984, reports that the hydrophobic silica "Aerosil" R972 is made from "Aerosil" 130, a hydrophilic silica which has a surface area of 130 $m^2/g$; the hydrophobic silica "Aerosil" R974 is made from "Aerosil" 200, a hydrophilic silica which has a surface area of 200 $m^2/g$; and the hydrophobic silica "Aerosil" R976 is made from "Aerosil" 300, a hydrophilic silica which has a surface area of 300 $m^2/g$. Because the finer silicas are more difficult to treat, more free hydroxyls remain on the surfaces of the finer silicas, namely 30%, 40%, and 50% on the hydrophobic R972, R974, and R976, respectively. A bulletin entitled "Cab-O-Sil" N70-TS Hydrophobic Fumed Silica of Cabot Cab-O-Sil Division, Tuscola, Ill., dated September 1983, states that this hydrophobic silica imparts "excellent flow and sag resistance to epoxy adhesives with no adverse effect on the strength of the adhesive bond" (page 23). The identification of this hydrophobic silica has since been changed to TS-720.

U.S. Pat. No. 3,024,146 (Bueche et al.) concerns a certain silicone rubber composition which contains a hydrophobic silica, specifically a trialkylhalogenosilane-treated silica aerogel, and provides adhesive bonds that better resist repeated freezing and thawing in the presence of water. If one instead employs a silica which has been treated to become hydrophobic by forming silicon-bonded alkoxy groups on the surface of the silica particles, "one will not obtain the same properties or results" (col. 3, lines 26-33). While the adhesives of the examples are pastes, they also can be used as "pressure-sensitive adhesive tapes" (col. 6, lines 10-15, and col. 5, and col. 5, lines 59-70).

No other mention has been found in the prior art concerning the use of hydrophobic silica in pressure-sensitive adhesive tape. Examples 2 and 3 of the above-cited Levens patent include "fumed silica" in their microbubble-filled pressure-sensitive adhesive layers (col. 5, line 9). U.S. Pat. No. 4,415,615 (Esmay et al.) concerns a pressure-sensitive adhesive tape, the adhesive layer of which is a cellular membrane that may be formed by photopolymerizing a frothed monomer composition which preferably has a viscosity above 5000 cps. The Esmay patent teaches that such viscosity can be attained, by mixing the monomers with a thixotropic agent such as "fumed silica", (col. 2, lines 66-68). "Fumed silica" as produced is hydrophilic.

Chemical Abstracts, vol. 88, 1978, reports under 88:153860 (page 59) that Japanese Kokai 77,133,339 dated 8 Nov. 1977 has an example wherein 100 parts acrylic pressure-sensitive adhesive, solids contents 40%, was ball-milled with 10 parts $SiO_2$ (20–50 nm) for 8 hours, coated and dried "to give adhesive sheets with a nontacky surface".

U.S. Pat. No. 2,859,198 (Sears et al.) modifies rubbery compositions with a finely-divided inorganic solid silicon-containing material, such as silica, which has been coated with an organo-siloxane material that provides a hydrophobic surface. This is said to be a substitute for carbon black reinforcing pigments to provide white or light-colored rubbery compositions.

U.S. Pat. No. 4,163,081 (Schulz) teaches that fume(d) silica is a reinforcing filler in certain self-adhering silicone elastomers, and that the silica "can be treated with organosilicon materials such as chlorosilanes, silazanes, alkoxysilanes and cyclic siloxanes to produce hydrophobic surfaces" (col. 6, line 47–52).

DISCLOSURE OF INVENTION

The invention significantly increases the cohesive strength of acrylic pressure-sensitive adhesive tape, while maintaining or improving adhesion and physical properties. This improvement is particularly remarkable at elevated temperatures such as 70° C. The novel tapes exhibit cohesive strengths which are believed to be significantly higher than have heretofore been attained by any pressure-sensitive adhesive tape which has good adhesion and physical properties. Because of this improvement, it should now be possible to eliminate the unfilled surface layers from microbubble-filled, foam-like pressure-sensitive adhesive tape of the above-cited U.S. Pat. No. 4,223,067, even for uses requiring high static shear resistance at 70° C. It should be feasible to manufacture such a foam-like pressure-sensitive adhesive tape at a cost comparable to that of a foam-backed pressure-sensitive adhesive tape.

When the thickness of the adhesive layer of the novel tape does not exceed 0.1 or 0.2 mm, it preferably does not employ glass microbubbles. In such tapes, the same extraordinary increase in cohesive strengths is realized, especially at elevated temperatures, while retaining or improving adhesion and physical properties, and this should permit the use of pressure-sensitive adhesive tapes where other types of adhesives or mechanical fasteners have heretofore been required.

Briefly, the novel tape is similar to that of the above-cited U.S. Pat. Re. 24,906 in that its pressure-sensitive adhesive layer comprises a copolymer of by weight (a) a major proportion of acrylic acid ester of nontertiary alkyl alcohol, the molecules of which have from 1 to 14 carbon atoms, at least a major proportion of said molecules having a carbon-to-carbon chain of 4–12 carbon atoms terminating at the hydroxyl oxygen atom, said chain containing at least about one-half the total number of carbon atoms in the molecule, and (b) a minor proportion of at least one copolymerizable monomer having a polar group. The novel tape differs from that of the Ulrich patent in that its pressure-sensitive adhesive layer includes hydrophobic silica having a surface area of at least 10 $m^2/g$ and in an amount comprising by weight from 2 to 15 parts per hundred resin (phr). Preferably the surface area of the hydrophobic silica is from 50 to 400 $m^2/g$ (B.E.T. surface area).

The novel tape, when compared to an identical tape except omitting the hydrophobic silica, also tends to exhibit better adhesion and physical properties (including resistance to cold shock).

To attain high cohesive strengths (as measured either by static shear values at elevated temperatures or by T-Peel at room temperature), the pressure-sensitive adhesive layer of the novel tape should be crosslinked. A preferred crosslinking agent is 1,6-hexanediol diacrylate. Crosslinking is especially easy to control by photopolymerizing the monomer in admixture with that photocrosslinking agent or those taught in U.S. Pat. No. 4,330,590 (Vesley) and No. 4,329,384 (Vesley et al.). Bisamides are preferred crosslinking agents for solution polymerization.

In the current state of the art, photopolymerization preferably is carried out in an inert atmosphere such as an inert gas. An inert atmosphere can be achieved by temporarily covering the photopolymerizable coating with a plastic film which is transparent to ultraviolet radiation, and irradiating through that film in air. If the polymerizable coating is not covered during photopolymerization, the permissible oxygen content of the inert atmosphere can be increased by mixing into the photopolymerizable composition an oxidizable tin compound as taught in U.S. Pat. No. 4,303,485 (Levens), which also teaches that by doing so, thick coatings can be polymerized in air.

As taught in that Levens patent, a mixture of monomers is initially of such low viscosity that it cannot be coated uniformly at typical thicknesses and so should be partially polymerized to a syrup of coatable viscosity. Preferably this is done before adding the hydrophobic silica, because the silica is dispersed faster and more easily into a mixture of coatable viscosity. A uniform dispersion is more readily achieved when hydrophobic silica comprises by weight 4 parts per hundred resin (phr) than when it comprises only 2 phr. Also higher cohesive strengths at 70° C. and better adhesion have been attained at 4 –8 phr hydrophobic silica than at the 2 phr level. When the amount of the hydrophobic silica has exceeded 8 phr, it has been necessary to employ a high-shear mixer such as a paint mill to attain uniform dispersions. By doing so useful dispersions have been attained at loadings as high as 15 phr. When the pressure-sensitive adhesive layer is to contain glass microbubbles, they preferably are added after the hydrophobic silica has been dispersed, because they might be broken in a high-shear mixer.

Tapes of the invention which have been photopolymerized exhibit substantially increased cohesive strengths and adhesion after a period of dwell. This is important for repositioning tapes, but within a few days they normally cannot be removed.

Instead of being photopolymerized, tapes of the invention can be made by solution polymerization after mixing the hydrophobic silica with the monomers. However, the objectives of the invention have not been achieved by adding hydrophobic silica after the polymerization and before coating. Because of this, it is presumed that the hydrophobic silica is entering into some sort of interaction (physical or chemical) with monomers during polymerization, although the mechanism of the invention is not understood.

When hydrophilic silica has been substituted for hydrophobic silica, less improvement has been noted. Furthermore, the use of hydrophilic silica tends to increase significantly the viscosity of the prepolymer compositions, and the consequent higher-shear mixing may be less suitable for large-scale production. Upon adding hydrophilic silica to a composition which is polymerizable to a pressure-sensitive adhesive state, there is a rapid increase in viscosity which greatly limits the coatability of the composition. In contrast, the addition of 4 phr hydrophobic silica produces no significant increase in viscosity.

When the adhesive layer is filled with glass microbubbles, the microbubbles should have a density less than 1.0 g/cm$^3$, an average diameter of 10 to 200 micrometers, and should comprise from 10 to 65 volume percent of the pressure-sensitive adhesive, layer.

In making the copolymer of the pressure-sensitive adhesive layer of the novel tape, the amount of the aforementioned copolymerizable monomer (b) preferably is restricted so that the adhesive is tacky at ordinary room temperatures as taught in the above-cited Ulrich reissue patent. Tackiness at ordinary room temperatures is assured when copolymerizable monomer (b) comprises 3–12% by weight of said monomers (a) and (b), although the adhesive layer can be tacky at room temperature when the copolymerizable monomer (b) comprises as much as 20% by weight of the adhesive matrix. Larger amounts may require the tape to be heated to make its adhesive matrix tacky and pressure-sensitive. When the copolymerizable monomer (b) comprises less than about 2% of said monomers (a) and (b), the desired high cohesive strengths at 70° C. have not been realized.

The polar group of the copolymerizable monomer (b) preferably is a carboxylic acid group. Suitable copolymerizable monomers having a polar group include acrylic acid, methacrylic acid, itaconic acid, maleic anhydride, acrylamide, and N-vinylpyrrolidone. To date, the objectives of the invention have not been achieved when the only copolymerizable monomer is N-vinylpyrrolidone, the only such tests having been made at 70 parts of isooctyl acrylate and 30 parts by weight of N-vinylpyrrolidone. Other copolymerizable monomers may also be used in making the copolymer of the the novel pressure-sensitive adhesive tape such as alkyl vinyl ethers, vinylidene chloride, styrene, and vinyltoluene, but only in such small amounts that do not detract from the improved static shear values.

The adhesive layer of the novel tape can have a cellular adhesive membrane as taught in U.S. Pat. No. 4,415,615 (Esmay et al.), but because of the voids, static shear values at 70° C. may be less than are attained when the adhesive layer is void-free.

The following tests were used to evaluate tapes of the invention.

STATIC SHEAR VALUE AT 70° C.

A strip of tape 1.27 cm in width is adhered by its adhesive to a flat, rigid stainless steel plate with an exactly 1.27-cm length of the tape in contact with the panel. Before testing, a 1000-g weight rests over the bonded area for 15 minutes. Then the panel with the adhered tape is placed in an air-circulating oven which has been preheated to 70° C., and after 15 minutes, a weight is hung from the free end of the tape, with the panel tilted 2° from the vertical to insure against any peel forces. The time at which the weight falls is the "Static Shear Value at 70° C.". If no failure, the test is discontinued at 10,000 minutes. Only cohesive failures are reported.

Because identical pressure-sensitive adhesives of increasing thicknesses exhibit decreasing static shear values, smaller weights are used for tapes of increased adhesive thickness as follows:

| Adhesive Thickness in mm | Weight in kg |
| --- | --- |
| Less than 0.15 | 3 |
| 0.15–0.3 | 2 |
| 0.3–0.5 | 1.5 |
| 0.5–0.75 | 1 |
| Over 0.75 | 0.75 |

Because the cohesive strength of acrylic pressure-sensitive adhesive is less at relatively low proportions of the aforementioned copolymerizable monomer (b), the length of the tape in contact with the panel should be 2.54 cm when the copolymerizable monomer (b) comprises about 5% or less by weight of said monomers (a) and (b).

T-PEEL

T-Peel is measured as in ASTM D-1876-72 except that the test tapes were 0.5 inch (1.27 cm) in width and were tested only two hours after being adhered to aluminum foil backings. Results are reported in Newtons per decimeter (N/dm). Only cohesive failures are reported.

T-Peel provides a quantitative value of cohesive strength and is less sensitive to differences in the adhesion of the pressure-sensitive adhesive to the test surface.

180° Peel Adhesion

The adhesive layer to be tested is formed on or transferred to 0.05 mm thick, chemically primed, aluminum-vapor-coated, biaxially oriented poly(ethylene terephthalate) film (unless otherwise indicated) which then is slit to a width of ½ inch (1.27 cm). The resulting tape is self-adhered to a smooth stainless steel plate under the weight of a 2.04 kg hard rubber covered steel roller, 2 passes in each direction. After dwelling at 23° C. for the time indicated, "180° Peel Adhesion" is measured by moving the free end of the tape away from the steel plate at a rate of about 0.5 cm per second (using a tensile tester).

90° Peel Adhesion

The adhesive layer to be tested is formed on or transferred to 0.05 mm thick, chemically primed, aluminum-vapor-coated, biaxially oriented poly(ethylene terephthalate) film (unless otherwise indicated) which then is slit to a width of ½ inch (1.27 cm). The resulting tape is self-adhered to a smooth stainless steel plate under the weight of a 2.04 kg hard rubber covered steel roller, 2 passes in each direction. After dwelling at 23° C. for the time indicated, "90° Peel Adhesion" is measured by moving the free end of the tape away from the steel plate at 90° and at a rate of about 0.5 cm per second (using a tensile tester).

In the following examples, parts are given by weight. The glass microbubbles used in the examples had a density of 0.15 g/cm$^3$ and were 20–150 micrometers in diameter (average 55 micrometers). Hydrophobic silicas used in the examples were:

| | Hydrophobic Treatment | Estimated Surface Area (m$^2$/g) |
| --- | --- | --- |
| "Aerosil" 972 | Dimethyl dichlorosilane | 110 |
| "Aerosil" 974 | Dimethyl dichlorosilane | 180 |

-continued

| | Hydrophobic Treatment | Estimated Surface Area (m²/g) |
|---|---|---|
| "Aerosil" 202 | Poly(dimethyl siloxane) | 130 |
| "Aerosil" 805 | Trimethoxyoctylsilane | 180 |
| "Aerosil" 812 | Hexamethyl disilazane | 260 |
| "Cab-O-Sil" N70-TS | Poly(dimethyl siloxane) | 100 |
| "Tullanox" 500 | Hexamethyl disilazane | 225 |
| "Sipernat" D17 | Dimethyl dichlorosilane | 100 |

Each of these was converted from fumed silica except "Sipernat" D17 (a product of Degussa) which was converted from precipitated hydrophilic silica. "Tullanox" 500 is produced by Tulco, Inc., Ayer, Mass.

Example 1

A series of pressure-sensitive adhesive tapes were prepared from a syrup made from 91 parts of isooctyl acrylate and 9 parts of acrylic acid which had been partially thermally polymerized using 0.016 part benzoylperoxide at 51° C. in a glass-lined vessel after purging with nitrogen. The syrup had a viscosity of 3600 cps (Brookfield), an inherent viscosity of 2.84, and a degree of polymerization of 8%. After adding 0.1 part per hundred syrup (phr) of 2,2-dimethoxy-2-phenyl acetophenone photoinitiator ("Irgacure" 651), 0.12 phr of hexanedioldiacrylate crosslinking agent, 8 phr of glass microbubbles, and hydrophobic silica ("Aerosil" R972) as indicated in Table I, the mixture was thoroughly mixed with a propeller mixer at 500 rpm for ten minutes and then carefully degassed in a desiccator using a vacuum pump.

To make each tape of Example 1, the mixture was fed to the nip of a knife coater between a pair of transparent, biaxially oriented poly(ethylene terephthalate) films, the facing surfaces of which had low-adhesion silicone coatings. The knife coater was adjusted to provide a coating thickness of approximately 0.8 mm. The composite emerging from the roll coater was irradiated with an exposure of 410 mJ/cm² (Dynachem units) from a bank of lamps, 90% of the emissions of which were between 300 and 400 nm with a maximum at 351 nm. The composite was cooled by blowing air against both films during the irradiation to keep the temperature of the films below 85° C. to avoid wrinkling of the films.

The resulting crosslinked pressure-sensitive adhesive tapes were tested as reported in Table I. For comparison, an identical tape was made using four parts of a hydrophilic silica, namely "Aerosil" 130, a fumed silica having a surface area of 130 m²/g.

TABLE I

| | Hydrophobic silica | | | Hydrophilic Silica |
|---|---|---|---|---|
| | 0 | 2 Phr | 4 phr | 4 phr |
| Static Shear value at 70° C. | | | | |
| under 0.75 kg (minutes) | 44 | 1151 | 10,000 | — |
| under 1.0 kg (minutes) | 75 | 77 | 10,000 | 46 |
| 180° Peel Adhesion (N/dm) | | | | |
| 20-minute dwell | 145 | 155 | 165 | 145 |
| 3-days dwell | 189 | 254 | 296 | 214 |
| Tensile Strength (N/mm²) | 0.61 | 0.77 | 0.88 | 0.48 |
| Elongation (%) (PSTC-31) | 977 | 961 | 903 | 539 |

EXAMPLES 2-4

A series of tapes were prepared identically to those of Example 1 except that each was made with four phr of a different hydrophobic silica, namely "Aerosil" R202, R805 and R812. Test values are reported in Table II together with those of a tape identical to that of Example 1 containing four phr of "Aerosil" R972 (called "1A" in Table II).

TABLE II

| Example | 1A | 2 | 3 | 4 |
|---|---|---|---|---|
| Hydrophobic silica | R972 | R202 | R805 | R812 |
| Static Shear Value at 70° C. under 0.75 kg (min.) | 10,000 | 10,000 | 1700 | 630 |
| 180° Peel Adhesion (N/dm) | | | | |
| 20-minute dwell | 165 | 166 | 177 | 169 |
| 3-days dwell | 296 | 301 | 277 | 260 |
| Tensile Strength (N/mm²) | 0.88 | 0.82 | 0.77 | 0.72 |
| Elongation (%) | 903 | 963 | 896 | 858 |

EXAMPLE 5

A series of tapes were prepared as in Example 1 except that the syrup was prepared from 90 parts of isooctyl acrylate and 10 parts of acrylic acid, and the initial partial polymerization was effected by ultraviolet irradiation instead of thermally. In making the coating, 0.14 phr of "Irgacure" 651 was used, the crosslinking agent was changed to 0.15 phr of the photoactive s-triazine shown at col. 6, line 65 of U.S. Pat. No. 4,330,590 (Vesley), the glass microbubbles were omitted, and the knife coater was adjusted to provide a coating thickness of approximately 0.25 mm. Test values are reported in Table III.

TABLE III

| | Hydrophobic silica | | |
|---|---|---|---|
| | 0 | 2 phr | 4 phr |
| Static Shear value at 70° C. under 3.0 kg (minutes) | 64 | 332 | 10,000 |
| 180° Peel Adhesion (N/dm) | | | |
| 20-minute dwell | 63 | 59 | 83 |
| 3-days dwell | 308 | 352 | 395 |
| Tensile Strength (N/mm²) (PSTC-31) | 0.69 | 0.88 | 1.56 |
| Elongation (%) | 900 | 1010 | 1157 |

The "180° Peel Adhesion" of Table III was obtained using an aluminum foil backing, 0.05 mm in thickness.

EXAMPLE 6

To a mixture of 90 parts isoctyl acrylate, 10 parts acrylic acid, and 0.2 part benzoyl peroxide was added ethyl acetate to form a solution comprising 42% monomer solids. This masterbatch was divided into five samples, to four which were added silica in amounts indicated below based on 100 parts of monomer:

Sample 1: No additives
Sample 2: 2 phr hydrophobic silica ("Aerosil" R972)
Sample 3: 4 phr hydrophobic silica ("Aerosil" R972)
Sample 4: 2 phr hydrophilic silica ("Aerosil" 130)
Sample 5: 4 phr hydrophilic silica ("Aerosil" 130)

The five samples were contained in 1 qt. brown narrow-mouth bottles. Each was purged with nitrogen at a rate of one liter/min. for 2 minutes, then sealed and placed in a 55° C. polymerization bath for 24 hours, resulting in:

|          | Inherent viscosity | Viscosity cps (Brookfield) |
|----------|--------------------|-----------------------------|
| Sample 1 | 1.85               | 23,600                      |
| Sample 2 | 1.62               | 17,400                      |
| Sample 3 | 1.43               | 11,100                      |
| Sample 4 | 2.07               | 37,400                      |
| Sample 5 | 1.53               | 13,850                      |

Upon removal from the bath, 250 g of toluene was added to each bottle to reduce the viscosity. After adding 0.05 phr N,N′-bis-1,2-propyleneisophthalamide crosslinking agent, each sample was knife-coated onto chemically primed, biaxially oriented poly(ethylene terephthalate) film 0.05 mm in thickness. After drying for one hour at 70° C., each dried, crosslinked pressure-sensitive adhesive layer was about 0.05 mm in thickness. Test results are reported in Table Iv.

TABLE IV

|                                                | Hydrophobic silica | | Hydrophilic silica | |
|------------------------------------------------|------|-------|-------|------|
|                                                | 0 | 2% | 4% | 2% | 4% |
| Static Shear Value at 70° C. under 2.0 kg (minutes) | 1870 | 4584 | 10,000 | 2161 | 16 |
| 180° Peel Adhesion (N/dm)                      |      |      |       |      |     |
| 20-minute dwell                                | 94   | 96   | 94    | 76   | 70  |
| 3-days dwell                                   | 142  | 125  | 147   | 109  | 99  |

The "180° Peel Adhesion" of Table IV was obtained using poly(ethylene terephthate) film backing which did not have an aluminum vapor coat.

EXAMPLE 7

Two pressure-sensitive adhesive tapes were made as described in the "Typical Tape-making Procedure" at col. 6 of U.S. Pat. No. 4,415,615 (Esmay et al.), using as the polymerizable monomers 87.5 parts of isooctyl acrylate and 12.5 parts of acrylic acid. After the partial polymerization and before frothing, 6 phr hydrophobic silica ("Aerosil" R972) and 8 phr glass microbubbles (as in Example 1) were added to one of the syrups. The tapes, which had an adhesive thickness of 1 mm, were tested with results reported in Table V.

TABLE V

|                                              | Hydrophobic silica | |
|----------------------------------------------|-------|-------|
|                                              | 0     | 6 phr |
| Static Shear Value at 70° C.                 |       |       |
| under .75 kg (minutes)                       | 931   | 5578  |
| T-Peel (N/dm)                                | 105   | 150   |
| 180° Peel Adhesive (N/dm)                    |       |       |
| 20-minute dwell                              | 81    | 84    |
| 3-days dwell                                 | 111   | 131   |
| 90° Peel Adhesion (N/dm)                     |       |       |
| 20-minute dwell                              | 163   | 165   |
| 3-days dwell                                 | 211   | 259   |
| Tensile Strength (N/mm$^2$)                  | 0.65  | 1.02  |
| Elongation (%) (PSTC-31)                     | 628   | 595   |

EXAMPLE 8

A pressure-sensitive adhesive tape was made as in Example 7 except as follows: the polymerizable monomers were 90 parts isooctyl acrylate and 10 parts acrylic acid, the glass microbubbles were omitted, and there were 15 phr of the hydrophobic silica. Test results are reported in Table VI.

TABLE VI

| 90° Peel Adhesion (N/dm) | |
|--------------------------|-----|
| 20-minute dwell          | 51  |
| T-Peel (N/dm)            | 163 |

EXAMPLE 9

A series of pressure-sensitive adhesive tapes were made in the same way as in Example 5 except that the polymerizable monomers were 76 parts of isooctyl acrylate, 20 parts of N-vinyl-2-pyrrolidone, and 4 parts of acrylamide as the polymerizable monomers. Test results are reported in Table VII.

TABLE VII

|                                  | Hydrophobic silica | | | Hydrophilic silica | |
|----------------------------------|--------|--------|--------|--------|--------|
|                                  | 0      | 2 phr  | 4 phr  | 2 phr  | 4 phr  |
| Static Shear Value at 70° C.*    |        |        |        |        |        |
| under 1.5 kg (minutes)           | 10,000 | 10,000 | 10,000 | 5227   | 10,000 |
| T-Peel (N/dm)                    | 89     | 93     | 99     | 92     | 84     |
| 180° Peel Adhesion (N/dm)        |        |        |        |        |        |
| 20-minute dwell                  | 88     | 89     | 90     | 92     | 63     |
| 3-days dwell                     | 89     | 107    | 109    | 100    | 73     |
| 90° Peel Adhesion (N/dm)         |        |        |        |        |        |
| 20-minute dwell                  | 78     | 70     | 68     | 75     | 69     |
| 3-days dwell                     | 97     | 94     | 102    | 82     | 84     |

*Length of tape in contact equals 2.54 cm

We claim:

1. Method of making a pressure-sensitive adhesive tape comprising the steps of:
   (1) preparing a syrup of coatable viscosity using by weight (a) a major proportion of acrylic acid ester of nontertiary alkyl alcohol, the molecules of which have from 1 to 14 carbon atoms, at least a major proportion of said molecules having a carbon-to-carbon chain of 4–12 carbon atoms terminating at the hydroxyl oxygen atom, said chain containing at least about one-half the total number of carbon atoms in the molecule, and (b) a minor proportion of at least one copolymerizable monomer having a polar group,
   (2) mixing into the syrup hydrophobic silica having a surface area of at least 10 m$^2$/g and in an amount comprising from 2 to 15 phr,
   (3) coating the mixture onto a carrier, and
   (4) polymerizing the coating to a pressure-sensitive adhesive state.

2. Method as defined in claim 1 wherein a crosslinking agent is added to the mixture prior to step (3).

3. Method as defined in claim 2 wherein a photoinitiator is added to the mixture prior to step (3), and ultraviolet radiation is employed to effect the polymerizing in step (4).

4. Method as defined in claim 3 wherein the crosslinking agent is photoactivatable.

5. Method of making a pressure-sensitive adhesive tape comprising the steps of:
   (1) forming a solution of polymerizable composition comprising by weight (a) a major proportion of acrylic acid ester of nontertiary alkyl alcohol, the molecules of which have from 1 to 14 carbon atoms, at least a major proportion of said molecules having a carbon-to-carbon chain of 4–12 carbon atoms terminating at the hydroxyl oxygen atom, said chain containing at least about one-half the total number of carbon atoms in the molecule, and (b) a minor proportion of at least one copolymerizable monomer having a polar group, (2) adding to the solution hydrophobic silica having a surface area of at least 10 $m^2/g$ and in an amount comprising from 2 to 15 phr, (3) polymerizing the composition, (4) coating the polymer onto a carrier, and (5) drying the coating to a pressure-sensitive adhesive state.

6. Method as defined in claim 5 wherein a crosslinking agent is added prior to step (4).

* * * * *

UNITED STATES PATENT AND TRADEMARK OFFICE
CERTIFICATE OF CORRECTION

PATENT NO. : 4,749,590

DATED : June 7, 1988

INVENTOR(S) : Klingen et al

It is certified that error appears in the above-identified patent and that said Letters Patent is hereby corrected as shown below:

col. 2, line 51, delete "and col. 5,".

col. 5, line 9, "adhesive, layer" should be --adhesive layer--.

col. 9, line 19, "Table Iv" should be -- Table IV --.

Signed and Sealed this

Fourth Day of July, 1989

*Attest:*

DONALD J. QUIGG

*Attesting Officer*    *Commissioner of Patents and Trademarks*